United States Patent [19]

Geishecker

[11] 3,955,170
[45] May 4, 1976

[54] SOLID STATE SWITCH

[75] Inventor: Stephen P. Geishecker, Wrentham, Mass.

[73] Assignee: Texas Instruments Incorporated, Dallas, Tex.

[22] Filed: Nov. 29, 1974

[21] Appl. No.: 528,064

[52] U.S. Cl. .......................... 338/22 SD; 318/471; 318/473; 338/220; 338/232; 338/316
[51] Int. Cl.² .......................................... H01C 7/04
[58] Field of Search ............................. 338/22–25, 338/220, 232, 322, 316, 324, 332; 318/471–473; 317/41; 310/68 C; 312/107, 109, 111; 339/48, 49 B; 174/52 R

[56] References Cited
UNITED STATES PATENTS

| | | | |
|---|---|---|---|
| 2,276,732 | 3/1942 | Ludwig et al. | 338/324 X |
| 2,853,656 | 9/1958 | Dowds | 174/52 R X |
| 3,203,744 | 8/1965 | Batke et al. | 312/108 X |
| 3,368,856 | 2/1968 | Tisdall et al. | 312/111 |
| 3,835,434 | 9/1974 | Kahn | 338/22 |
| 3,842,188 | 10/1974 | Peterson | 338/220 X |

Primary Examiner—C. L. Albritton
Attorney, Agent, or Firm—John A. Haug; James P. McAndrews; Russell E. Baumann

[57] ABSTRACT

A solid state switch particularly useful in assisting in the starting of permanent split capacitor (PSC) motors is disclosed in which a semiconductive element is used to affect the starting torque of the motor. The semiconductive element is a disk-shaped member composed of material having a relatively low resistance at temperatures below an anomaly point and a steeply sloped positive temperature coefficient (PTC) of resistivity at temperatures above the anomaly. The PTC element is mounted within a casing which comprises two identical interfitting halves and is in electrical connection with members which are combination contacts and terminals. The terminals extend through the casing wall and are provided with contact portions which engage the PTC element along an annular portion of the element near the outer periphery thereof. One contact is provided with spring fingers adapted to react against a wall of the casing to provide desired contact force.

10 Claims, 5 Drawing Figures

SOLID STATE SWITCH

This invention relates generally to electrical switches and more particularly to solid state switches. One of the many applications for such switches is in the starting of motors. The switch of the instant invention is particularly useful in assisting in the starting of permanent split capacitor motors which are used in most single phase room and unitary air-conditioning compressors. Such motors offer a desired compromise between starting torque, running efficiency and cost requirement for these horsepower sizes. One of the problems with using such motors however is that frequently the starting torque has not been sufficient to start the compressor under all field conditions. That is, the selection of the motor for the particular application might have been poor or the assembly of the motor into the compressor may have been improper or there may be a failure of the compressor to equalize in time. These problems are exacerbated by low voltage conditions which occur more and more often in recent years. There have been attempts to solve this problem including the use of a so-called "hard start kit". Conventionally such a kit consists of an additional capacitor (start capacitor) wired in parallel with the permanent capacitor (run capacitor) of the motor, and a relay, usually a potential relay, to switch the start capacitor out of the circuit as soon as the compressor starts. In addition to this an overcurrent or overload device was frequently used to protect the start winding of the motor in the event that the relay failed and did not switch out the start capacitor. That is, if the start capacitor is left in the circuit it may take very little time, for example 10 seconds, before the start winding of the motor burns out. Solid state switches have proven effective in providing a more reliable and safer alternative to the hard start problem. As described in U.S. Pat. No. 3,737,752 which issued June 5, 1973 to the assignee of the instant invention such a switch can comprise a plurality of elements having a positive temperature coefficient (PTC) of resistivity such as a doped barium titanate. The elements have a relatively low resistance when cool but change to an exceptionally high resistance very suddenly when heated above an anomaly point. When the PTC switch is wired in parallel with the run capacitor the resistance of the start circuit at the instant of starting is reduced so that the current through the start winding is increased along with the starting torque. The PTC elements heat up from the current passing therethrough so that within a short period of time, for example, a fraction of a second the temperature of the PTC elements exceed the anomaly temperature and the resistance increases to a very high value, for example 80,000 ohms, effectively switching themselves out of the circuit returning the compressor to the normal permanent split capacitor mode of operation. The PTC switch will remain in its high resistance state as long as the compressor continues to run. When the compressor is finally de-energized the PTC switch will begin to cool and within a few minutes will be ready for the next compressor start up.

As further set forth in U.S. Pat. No. 3,794,949 which issued Feb. 26, 1974 to the assignee of the instant invention there are many applications in which it is preferred to employ a single PTC element. Although the apparatus described and claimed in that patent is very flexible in use in that it can be used with either one or two PTC elements electrically connected in series or in parallel the voltage capability of the apparatus, particularly when a single PTC element is employed serves as a limiting factor in the uses for the reasons mentioned in the aforementioned patents. For instance, a switch made in accordance with the latter mentioned patent can be effectively used when serially coupled to the start winding of a split phase motor as shown in the patent since the initial PTC voltage is less than line voltage and once normal running speed is achieved the voltage across the PTC device is substantially less than twice the line voltage. However, when used to assist in starting a permanent split capacitor motor the voltage across the switch goes from approximately line voltage to nearly twice that value which may exceed the voltage capability of the switch.

It is therefore an object of the invention to provide a solid state switch having improved voltage capacity. Another object of the invention is to provide a solid state motor starting assist device accommodating a PTC element in a manner which improves its voltage capability as well as its reliability. Yet another object is the provision of a switch having an improved low cost housing, a switch with an improved contact system and a switch which is conducive to mass manufacturing techniques. Various additional objects and advantages will become readily apparent from the following description.

The invention accordingly comprises the elements and combination of elements, features of construction and manipulation and arrangements of parts, all of which will be exemplified in the structure hereinafter described, and the scope of the application of which will be indicated in the appended claims.

Briefly, a device made in accordance with the invention includes two identical interfitting case halves in which a PTC element is disposed. The PTC element is a generally cylindrical disk with electrically conductive coating on two opposite faces. A first contact comprising a generally circular plate having an outer diameter equal to or slightly less than the diameter of the disk and a recessed center portion is disposed in physical contact with one face while a second contact comprising a generally circular plate of the same outer diameter is disposed in physical contact with the other face of the disk. The center of the circular plate of the second contact is also removed from the disk and is additionally formed into a plurality of spring fingers adapted to engage the wall of a case half to provide desired contact force between the disk faces and the respective contacts.

BRIEF DESCRIPTION OF THE DRAWINGS

For the following detailed description corresponding elements in the various views of the drawings are indicated by common reference numerals.

As seen in FIG. 1 a solid state start assist switch 10 is coupled across a run capacitor C1 of a permanent split capacitor motor having a start winding $W_s$ and a run or main winding $W_m$. Start winding $W_s$ is serially coupled to the parallely connected capacitor C1 and switch 10.

Figure 1:
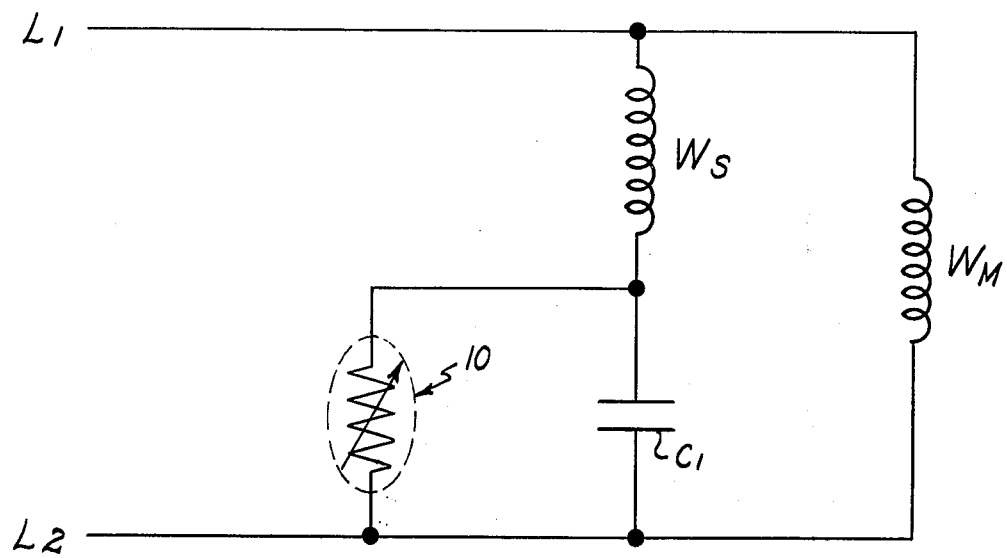
FIG. 1 is a schematic electrical circuit showing a typical use of a solid state switch made in accordance with this invention.

When power is applied to the motor via lead lines L1, L2 current flows through the start winding $W_s$ and through the parallel combination of the run capacitor C1 and the PTC switch 10. Initially the resistance of switch 10 is low which allows an inrush of current through the start winding. The surge current increases motor starting torque and also flows through the PTC switch 10 causing it to heat up above its anomaly temperature into its high resistance mode of operation. Typically the switching is accomplished within a fraction of a second, for example 16 electrical cycles. Thus, the PTC switch 10 will be in its low resistance mode of operation only long enough to overcome the initial inertia of the motor. Once the PTC switch 10 heats up above its anomaly temperature its resistance suddenly increases to the high resistance mode, for example 80,000 ohms, and effectively switches itself out the circuit. While the motor is running the PTC switch is maintained in its high resistance mode but upon deenergization of the motor the PTC switch will start to cool back to its low resistance state.

As seen in FIGS. 2–5 switch 10 comprises a top 12 and bottom 14 which are identical interfitting case halves. The case halves may be composed of suitable electrically insulative material, such as ceramic and is each provided with a groove 16 extending along one side and rib 18 extending along an opposite side. A channel 20 is formed in the bottom well 22 of the case halves to receive therein respective terminals to be discussed below. A cavity 24 is formed within the case halves for reception therein of the switching mechanism. The case halves fit together with rib 18 of case half 12 fitting into groove 16 of case half 14 and rib 18 of case half 14 fitting into groove 16 of can half 12. The switching mechanism comprises a cylindrical disk-like element 26 having two generally parallely extending faces on which are disposed respective conductive coatings 28 and 30. Element 26 is preferably comprised of material which has a low electrical resistance at temperatures below an anomaly temperature but has a steeply sloped positive temperature coefficient (PTC) of resistivity just above the anomaly temperature. An example of such material is barium titanate doped with a rare earth. Coatings 28, 30 of any suitable electrically conductive material may be applied by flame spraying, plating, silk-screening or the like.

Legs 31, 33 which depend from first and second contact plates 36, 38 respectively are respectively received in channels 20. Contact plate 38 is a generally circular plate of electrically conductive material having an outer diameter of either equal to or slightly less than the diameter of disk 26. The center portion of plate 38 is recessed away from disk 26 so that an annular surface area 40 is in physical contact with coating 30 of disk 26. The inner diameter of the annular surface area 40 may be approximately two thirds that of the outer diameter. Contact plate 36 is formed with the same outer diameter as that of contact plate 38 and is provided with a similar annular surface area 42 of approximately the same size. The center portion of contact plate 36 is not only recessed to provide clearance between the central portion of the plate and coating 28 of disk 26 but it is also provided with a plurality of spring fingers 44. These fingers react against a wall of casing half 12 and provides desired contact force between the disk 26 and the contact plates 36, 38. Thus, it is preferred to make contact plate 36 out of material which is not only electrically conductive but also material which has good spring characteristics.

Contact plates 36, 38 provide several specific advantages over conventional prior art contacts. The circular configuration of the contact plates obviates rubbing against the conductive coatings which occurs with conventional contacts. That is, as the temperature of the disk changes during cycling, conventional contacts change dimensions lengthwise causing a rubbing action and concomitant wearing of the conductive coating, however, with the annular contact there is no such dimensional change but rather a rolling action which causes merely a change in the contact force without concomitant rubbing.

Contacting disk 26 only along an outer peripheral berm, that is along the portions contacted by annular surfaces 40, 42 of contact plates 36, 38 also results in a more desirable current distribution. That is, it takes longer for the outer peripheral portion of the disk to heat up when energized than the inner portion of the disk since heat is transferred away from the outer portions faster than it is from the center. Since the resistance of the outer portion will therefore be lower than the resistance of the inner portion higher current flow and $I^2R$ heating will occur in the outer portion. Again, upon deenergization of the switch, the outer portion of the disk cools faster than the inner portion and therefore it will be at a lower resistance so that upon reenergization at any time more current can be forced through the disk with the contacts located as disclosed in this invention since the current can flow through the disk more nearly normal to the contact surfaces.

Recessing of the central portion of the contact plates reduces arcing across the disk faces from an area of high resistance to one of low resistance. Such arcing tends to occur when the disk is contacted by a flat member if there is any misalignment causing a slight void between the contact member and the disk. Arcs drawn to these last to heat low resistance regions cause high localized temperature burning the disk contact and even destroying the disk itself eventually.

Terminal blade 31 is attached to leg 31 of contact plate 36 by any convenient means as by welding while terminal blade 33 is attached to contact plate 38 in like manner. Each terminal blade preferably overlaps its respective leg 80 so that the blade will limit inward movement of the switch mechanism by butting the bottom wall of the opposite case half. Tabs 46, 48 formed in legs 31, 33 can be used to limit outward movement of the switch mechanism terminals 32, 34. Of course if it is preferred the legs and terminal blades can be made integrally in which case other tabs can strike from the plane of the terminal members to limit inward movement.

Figure 2:
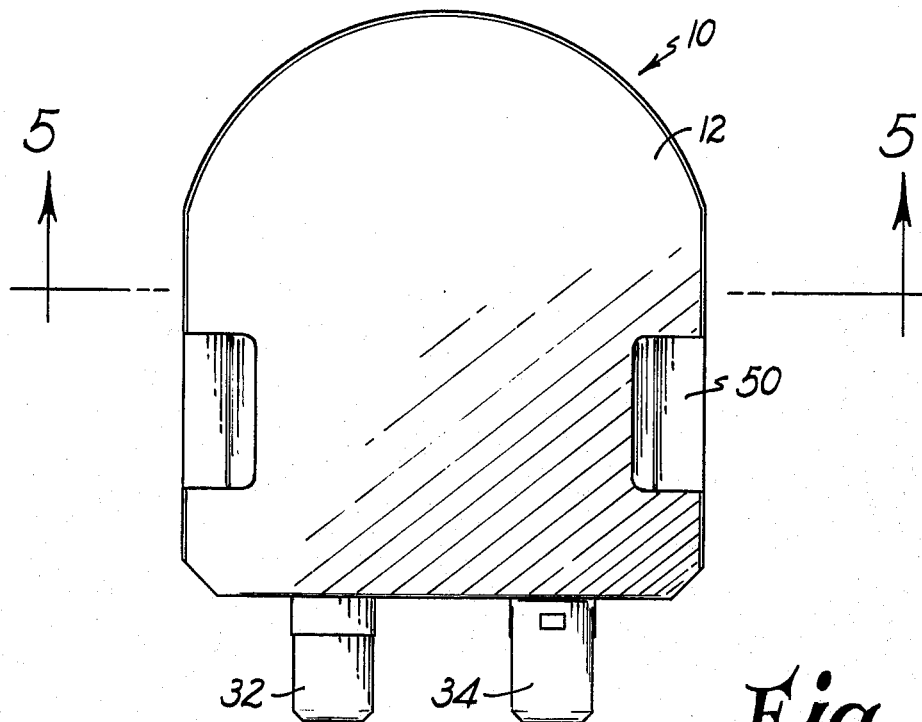
FIG. 2 is a top plan view of a solid state switch made in accordance with this invention.
Figure 3:
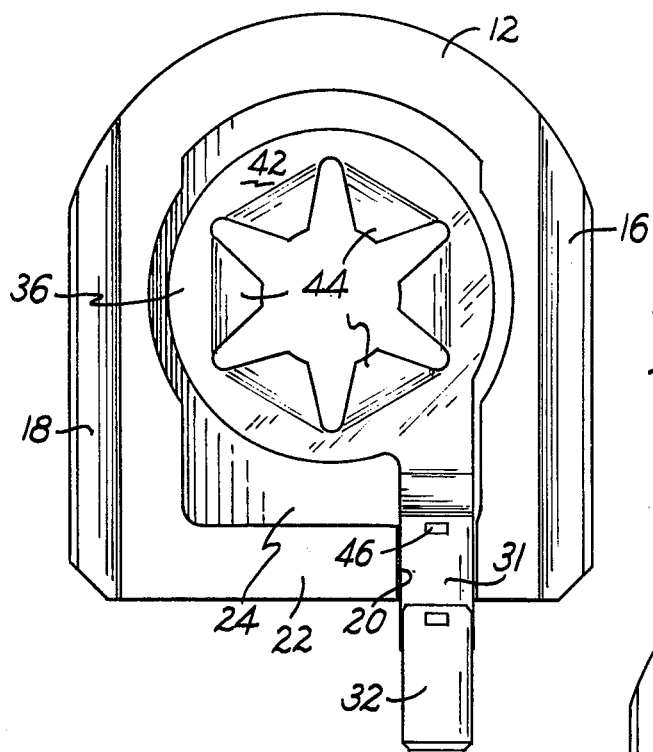
FIG. 3 is a top plan view of one case half with a contact/terminal member disposed therein.
Figure 4:
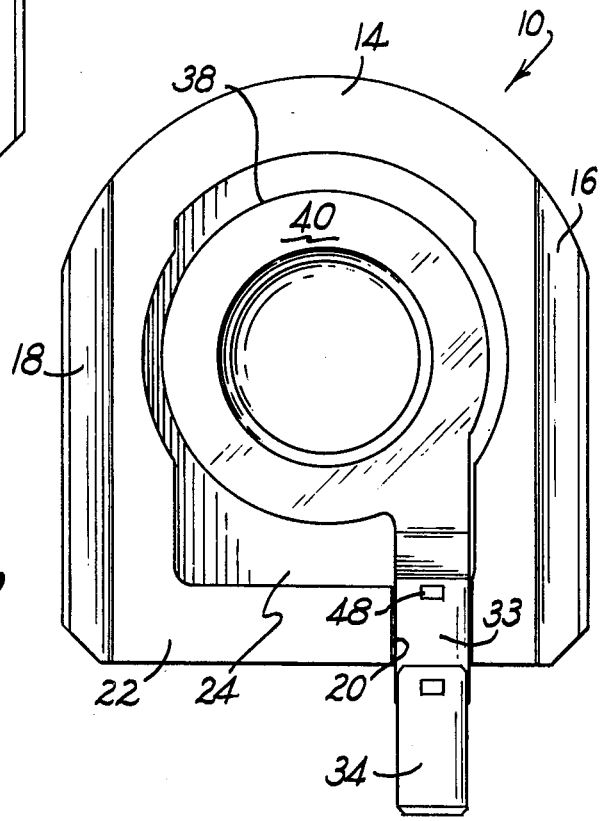
FIG. 4 is a top plan view of the other case half with a contact/terminal disposed therein.
Figure 5:
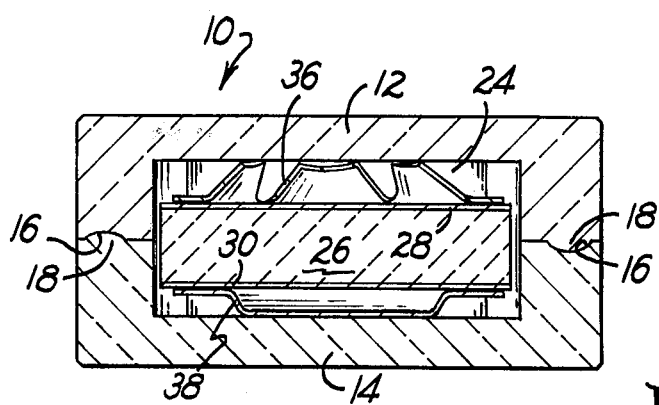
FIG. 5 is a cross-sectional view taken on lines 5—5 of FIG. 2.

The case halves 12, 14 are locked together by any convenient means such as by clip 50 shown in FIG. 2. If it is desirable to increase heat transfer between disk 26 and the case halves the space between the switch mechanism and the case halves may be filled with a heat conductive, electrically insulative grease such as a silicon grease. Care must be taken that the grease chosen does not deleteriously effect the PTC characteristic of disk 26. Use of such grease will decrease the time required for the switch to reset (cool down) after deenergization.

Thus it will be seen from the above description that the several enumerated objects of this invention have been realized.

Although the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A solid state electrical switch comprising:
a disc-shaped element of semiconductive material, the element having first and second opposed generally circular faces;
an electrically conductive coating disposed on each face;
first and second terminal members each including a contact plate having an annular portion, the outer diameter of each annular portion being no longer than the diameter of the circular faces, the contact plate of the first terminal member aligned with and in electrical communication with the first face and the contact plate of the second terminal member aligned with and in electrical communication with the second face, the annular portion defining a central portion therewithin;
the central portion of the first and second contact plate being formed so that the central portion of the first and second contact plates do not physically engage the conductive coating on the respective faces.

2. A solid state electrical switch according to claim 1 in which the central portion within the annular portion of the first and second contact plate is recessed.

3. A solid state electrical switch according to claim 1 in which the annular portions have an inner diameter approximately two thirds in length of the outer diameter.

4. A solid state electrical switch according to claim 1 further including an electrically insulative case, spring biasing means disposed in the case to provide desired contact force between the electrically conductive coatings on the disk and each respective contact plate.

5. A solid state electric switch comprising:
a disc-shaped element of semiconductive material, the element having first and second opposed generally circular faces;
an electrically conductive coating disposed on each face;
first and second terminal members each including a contact plate having an annular portion, the outer diameter of each annular portion being no longer than the diameter of the circular faces, the contact plate of the first terminal member aligned with and in electrical communication with the first face and the contact plate of the second terminal member aligned with and in electrical communication with the second face;
an electrically insulative casing, spring biasing means disposed in the casing to provide desired contact force between the electrically conductive coatings on the disk and each respective contact plate;
the central portion of at least one contact plate is formed with spring fingers, the fingers having distal end portions which abut the casing.

6. A solid state electrical switch according to claim 1 further including a casing, the casing comprising first and second identical interfitting case halves.

7. A solid state electrical switch according to claim 6 in which each case half has an elongated groove and an elongated rib, the rib of one case half adapted to be received in the groove of the other case half.

8. A solid state electrical switch according to claim 1 in which the semiconductive material has a PTC characteristic.

9. A solid state electrical switch comprising:
a disc-shaped element of semiconductive material, the element having first and second opposed generally circular faces;
an electrically conductive coating disposed on each face;
first and second terminal members each including a contact plate having an annular portion, the outer diameter of each annular portion being no longer than the diameter of the circular faces, the contact plate of the first terminal member aligned with and in electrical communication with the first face and the contact plate of the second terminal member aligned with and in electrical communication with the second face;
each terminal comprises a generally circular plate having generally the same diameter as that of the disk, the center of the plates being out of contact with the respective conductive coating, and a leg depends from each plate to serve as terminals.

10. A solid state electrical switch according to claim 9 in which the center of at least one of the plates is formed with a plurality of spring fingers extending inwardly from the annular portion and bent back out of the plane of the annular portion.

* * * * *